United States Patent
Park

(10) Patent No.: US 7,314,071 B2
(45) Date of Patent: Jan. 1, 2008

(54) METHOD FOR ENHANCING TEXTURE OF WOOD PANEL

(76) Inventor: Young Won Park, SongPa-Gu Oryun-Dong Olymic APT 326-1403, Seoul (KR)

( * ) Notice: Subject to any disclaimer, the term of this patent is extended or adjusted under 35 U.S.C. 154(b) by 0 days.

(21) Appl. No.: 11/343,727

(22) Filed: Jan. 31, 2006

(65) Prior Publication Data

US 2006/0288885 A1    Dec. 28, 2006

(30) Foreign Application Priority Data

Feb. 4, 2005    (KR) .................. 10-2005-0010402

(51) Int. Cl.
*B27D 1/04*    (2006.01)
(52) U.S. Cl. ..................... 144/350; 144/346
(58) Field of Classification Search ............. 144/346, 144/348, 350, 352, 380, 1.1, 2.1, 3.1; 156/153, 156/154, 267, 275.7; 427/291, 325, 402, 427/408
See application file for complete search history.

(56) References Cited

U.S. PATENT DOCUMENTS

| | | | | |
|---|---|---|---|---|
| 4,853,062 A | * | 8/1989 | Gartland | 156/219 |
| 4,890,656 A | * | 1/1990 | Ohsumi et al. | 144/350 |
| 6,660,333 B2 | * | 12/2003 | Frame | 427/271 |
| 6,964,722 B2 | * | 11/2005 | Taylor et al. | 156/230 |

* cited by examiner

*Primary Examiner*—Shelley M. Self
(74) *Attorney, Agent, or Firm*—Adams & Wilks

(57) ABSTRACT

A method for enhancing the texture of a wood panel. A pattern wood is attached to a surface of a plywood structure to form a wood panel. The surface of the pattern wood is then sanded followed by cleaning of the sanded surface. Thereafter, the surface of the pattern wood which has been sanded and cleaned is subjected to sand blasting. The sand blasted surface of the pattern wood is then coated with a first ultraviolet (UV) coating which is allowed to harden. Grooves are then formed on a second surface of the plywood structure opposite the first surface thereof. The wood panel is then cut to a preselected size. The surface of the pattern wood is then coated with a second UV coating which is allowed to harden.

10 Claims, 2 Drawing Sheets

METHOD FOR ENHANCING TEXTURE OF WOOD PANEL

BACKGROUND OF THE INVENTION

1. Field of the Invention

The present invention relates to manufacturing methods for enhancing the texture of a wood panel. The texture of the wood panel is almost the same as that of a natural wood panel by forming a rugged surface on a pattern wood with sand blasting.

2. Background Information

In general, as shown in FIG. 1, a normal wood panel 10 is made by attaching a pattern wood 12 on a glued plywood structure 11. However, the surface of the pattern wood 12 does not feel like natural wood due to its sanded and leveled surface.

As shown in FIG. 2, a wood panel 20 is made by attaching a pattern wood 22 on top of a glued plywood structure 21 in the shape of square panels. The surface of the wood panel 20 is coated with an ultraviolet (UV) coating 23 to protect it. The sides of the wood panel 20 are cut to form grooves 24, and the shapes of a tongue 25 and the groove 24 are such that the groove 25 of one wood panel 20 receives the tongue 25 of another wood panel 20. Grooves 26 are formed under the glued plywood to maintain a specific distance.

The texture of the wood panel using the normal pattern wood is the same as above. According to this, the normal wood panel has the problem of not having a natural look and feeling because the surface of the pattern wood is sanded and leveled.

SUMMARY OF THE INVENTION

The purpose of this invention is to make the almost same texture of natural wood by forming a rugged surface of the pattern wood through a sand blasting procedure.

The manufacturing procedure for enhancing the texture of wood panels according to the present invention is as follows. A pattern wood having a thickness in the range of 2 mm-5 mm is attached on top (first surface) of a glued plywood structure. The surface of the pattern wood is then sanded and cleaned. The surface of the pattern wood which has been sanded and cleaned is then subjected to sand blasting and cleaned. The surface of the pattern wood is then coated with a first ultraviolet (UV) coating for protection and the first UV coating is then hardened. Grooves are then formed under the wood panel, for example, on a second surface of the plywood structure opposite the first surface thereof, to provide flexibility to the wood panel. The wood panel is then cut to custom sizes. Tongue and groove connecting portions are formed on respective side surfaces of the wood panel for connecting the wood panel to other similar wood panels. The pattern wood is then coated with a second UV coating which is then hardened.

The method of attaching the pattern wood on the plywood structure is made up of two steps. First, the pattern wood and the plywood structure are pressed together at room temperature and left in the pressed state for a certain period of time at room temperature. Second, the pattern wood is pressed onto the plywood structure again under a temperature in the range of 110 to 130 degrees centigrade and then allowed to cool down.

DETAILED DESCRIPTION OF THE PREFERRED EMBODIMENT

Figure 1:
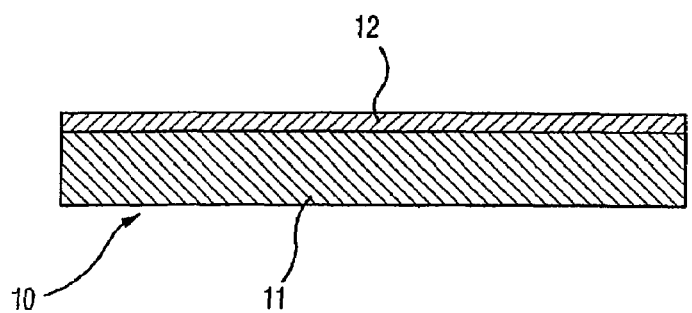
FIG. 1 is a side cross-sectional view showing the structure of the normal wood panel.
Figure 2:
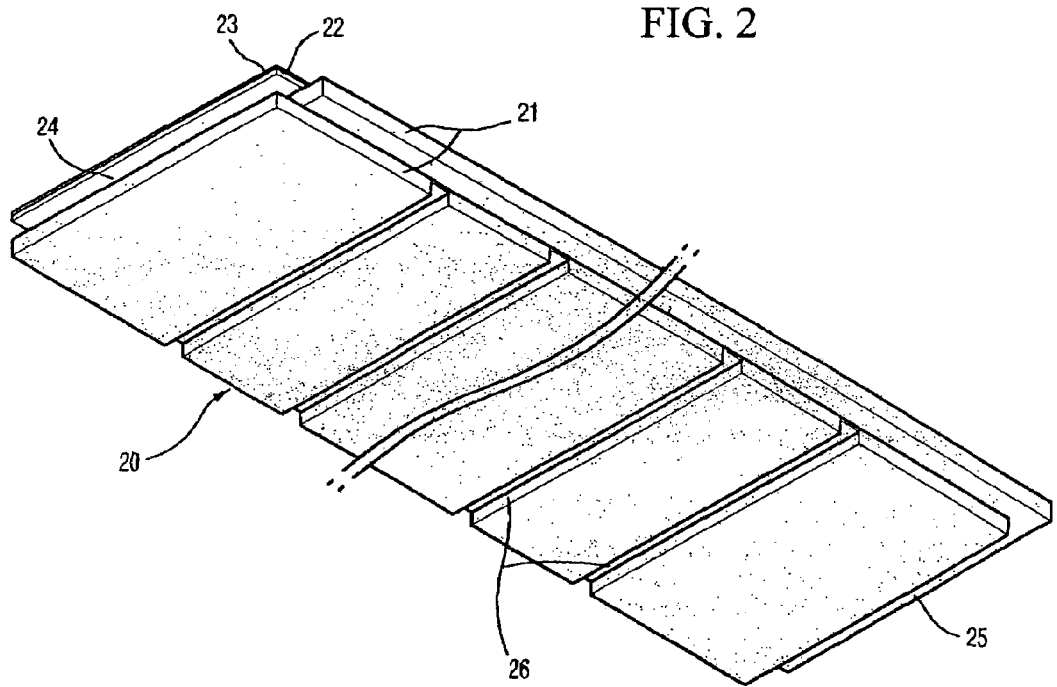
FIG. 2 is a perspective view of the wood panel according to the present invention.
Figure 3:
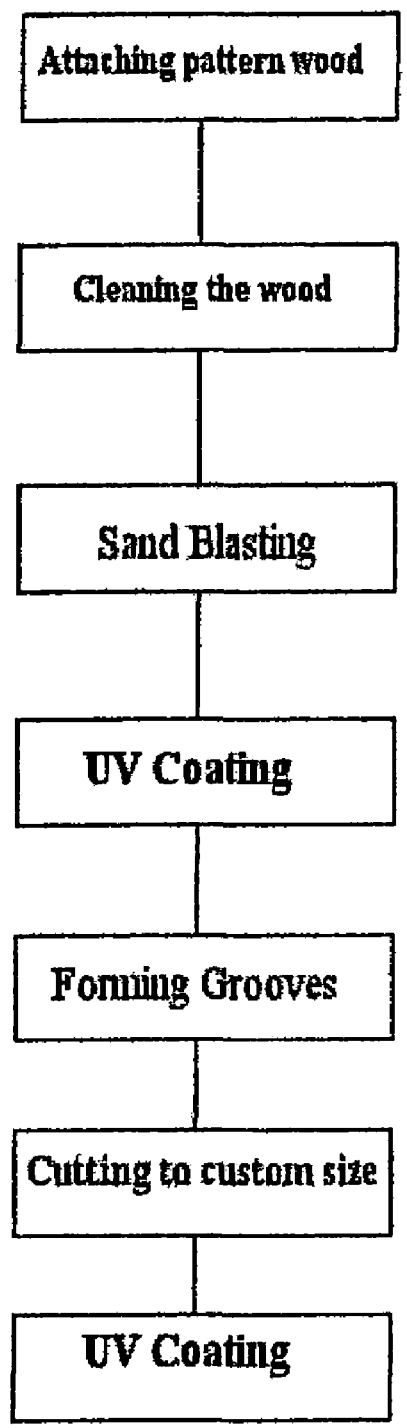
FIG. 3 shows a manufacturing process for the wood panel according to the present invention.

A detailed description of the procedural steps in the manufacturing method for enhancing the texture of a wood panel according to the present invention is set forth below with reference to FIGS. 2-3.

First Procedure

In the first procedure, a plywood structure 21 with 2 or more glued layers is first prepared in accordance with the purpose for which the plywood structure 21 will be used.

A pattern wood 22 is then attached on top (first surface) of the plywood structure 21 to form a wood panel 20. Glue is spread on the plywood structure 21 to attach the pattern wood 22 on top of the plywood structure 21. Preferably, the pattern wood 22 has a thickness in the range of 2 mm to 5 mm.

After attaching the pattern wood 22 on top of the plywood structure 21 with glue, the pattern wood 22 and the plywood structure 21 are pressed together. More specifically, the pattern wood 22 and the plywood structure 21 are first pressed together at room temperature and left in the pressed state for a certain period of time. After completion of the first pressing procedure, the wood panel 20 is pressed again at a temperature in the range of 110 to 130 degrees centigrade and allowed to cool down. The purpose of the first pressing procedure is to prevent bubble up. Because the pattern wood 22 has a thickness in the range of 2 mm to 5 mm, the glue on top of the plywood structure 21 causes the pattern wood 22 to shrink. The purpose of leaving the wood panel 20 in a pressed state for a certain period of time is to increase the adhesion. The second pressing procedure further increases the strength of the adhesion between the pattern wood 22 and the plywood structure 21.

After the first pressing procedure, the pattern wood 22 and plywood structure 21 are left in the pressed state for the certain period of time at room temperature. Furthermore, the glue for the wood panel 20 is preferably a natural vegetable-based glue which does not pose any health risks.

The reason for maintaining the temperature in the range of 110-130 degrees during the second pressing procedure is that at temperatures higher than the range temperatures, the pattern wood and the plywood structure might burn, and that at temperatures lower than the range temperatures, the adhesion force between the pattern wood and the plywood structure may weaken.

Second Procedure

The second procedure entails sanding the surface of the pattern wood 22 for beauty treatment after the first procedure. The surface of the pattern wood 22 must be vacuumed thoroughly during this stage.

Third Procedure

In the third procedure, the pattern wood 22 is subjected to sand blasting after the second procedure using a sand blaster, and then cleaned. The reason for the sand blasting procedure is to try to make the wood panel as natural as real wood by forming a rugged surface on the wood panel.

Due to the sand blasting, the pattern wood 22 has a rugged surface. The pattern wood 22 has a natural texture by sand blasting. The pattern wood has two parts that are soft and hard. The growth ring part is hard, so it can not be sanded away easily with sand blasting. But the other part is soft, so it is easily sanded away.

After sand blasting, the surface of the pattern wood 22 must be vacuumed thoroughly to remove any dust from the surface.

Fourth Procedure

The fourth procedure is to coat the top of the pattern wood 22 with a first UV coating after the third procedure to maintain the rugged surface formed by sand blasting. The first UV coating protects the surface of the pattern wood 22 from deteriorating due to scratching and humidity. After application of the first UV coating, the top surface of the pattern wood 22 is left under a UV lamp to strengthen the first UV coating.

The first UV coating must be dried thoroughly. If the fifth procedure is started before the first UV coating is dried thoroughly, the surface of the pattern wood 22 becomes not only rough, but it also becomes dusty easily.

Fifth Procedure

In the fifth procedure, grooves 26 are formed under the wood panel 20, for example, on the bottom surface (second surface) of the plywood structure 21, to give it flexibility.

The wood panel is installed either on the floor or the wall. If the surface of the floor or wall is not level, the wood panel 20 might bend, crack or even break. Therefore forming the grooves 26 under the wood panel 20 for flexibility is very important because without flexibility the wood panel 20 can be ripped up from the floor or wall.

Sixth Procedure

In the sixth procedure, the wood panel 20 is cut after finishing the fifth procedure. The cutting sizes can vary with the purpose of use.

Seventh Procedure

In the seventh procedure, tongue and groove connecting portions are formed on respective sides of the wood panel 20 to allow connection of the wood panel to other similar wood panels during the installation.

Eighth Procedure

In the eighth procedure, a second UV coating is formed on the surface of the pattern wood. The first purpose for the second UV coating is to remove the scratches on the pattern wood which might be formed during the fifth or seventh procedures. The second purpose for the second UV coating is to make the surface of the wood panel stronger. But the second UV coating must leave the rugged surface on the pattern wood.

The present invention can produce new demands from consumers because of the natural texture resulting from sand blasting of the wood panel.

The invention claimed is:

1. A method for enhancing the texture of a wood panel, comprising the steps of:
    attaching a pattern wood to a first surface of a plywood structure to form a wood panel;
    sanding a surface of the pattern wood followed by cleaning of the sanded surface;
    sand blasting the surface of the pattern wood which has been sanded and cleaned;
    coating the sand blasted surface of the pattern wood with a first ultraviolet (UV) coating and allowing the first UV coating to harden;
    forming grooves on a second surface of the plywood structure opposite the first surface thereof;
    cutting the wood panel to a preselected size; and
    coating the surface of the pattern wood with a second UV coating and allowing the second UV coating to harden.

2. A method according to claim 1; wherein the preparing step comprises the steps of wrapping the Chinese herbs and medicines in a net-type vessel; and boiling in a water tank containing water the net-type vessel containing the Chinese herbs and medicines at a temperature in the range of 110 to 130 degrees centigrade for 2-5 hours.

3. A method according to claim 2; wherein the attaching step includes the step of attaching the pattern wood to the first surface of a plywood structure using a glue.

4. A method according to claim 1; wherein the pattern wood has a thickness in the range of 0.3 mm to 3 mm.

5. A method according to claim 1; wherein each of the Chinese herbs and medicines consist of no more than 10% of the overall mixture.

6. A method according to claim 1; wherein the attaching step includes the step of attaching the pattern wood to the first surface of a plywood structure using a glue.

7. A method according to claim 1; wherein in the pouring step, the maintaining step comprises the step of maintaining the liquid mixture and the pattern wood in the vacuum tank for 2 hours.

8. A method of manufacturing a wood panel, comprising the steps of: preparing a treated pattern wood as set forth in claim 1; and attaching the treated pattern wood to a surface of a plywood structure to form the wood panel.

9. A method according to claim 8; wherein the pattern wood has a thickness in the range of 0.3 mm to 3 mm.

10. A method of manufacturing a wood panel, comprising the steps of: preparing a treated pattern wood as set forth in claim 2; and attaching the treated pattern wood to a surface of a plywood structure to form the wood panel.

* * * * *